A. ANDRI.
GEARING.
APPLICATION FILED NOV. 17, 1909.

1,017,070.

Patented Feb. 13, 1912.
3 SHEETS—SHEET 1.

Witnesses:
L. C. Badeau.
H. D. Penney

Inventor:
Alfred Andri,
By his Attorney, F. H. Richards.

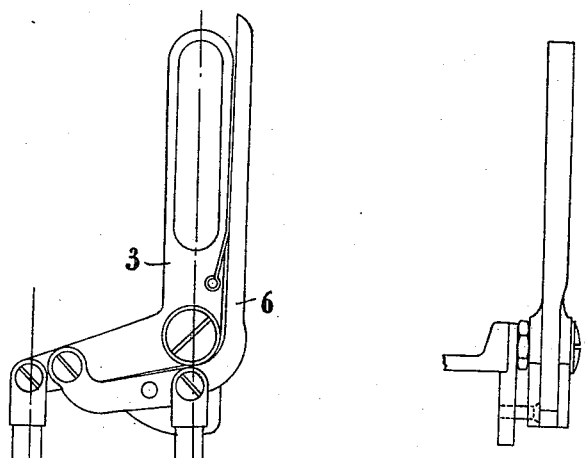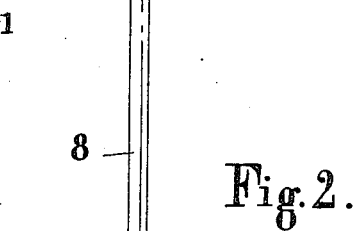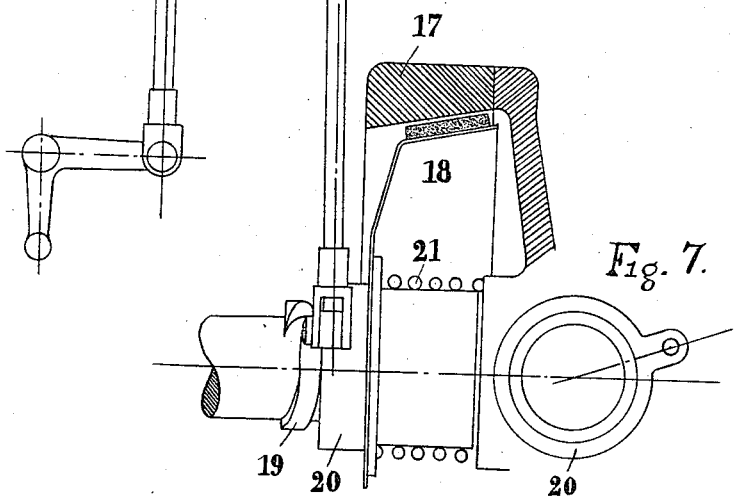

A. ANDRI.
GEARING.
APPLICATION FILED NOV. 17, 1909.
1,017,070.
Patented Feb. 13, 1912.
3 SHEETS—SHEET 3.
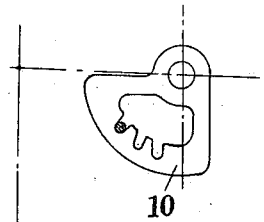
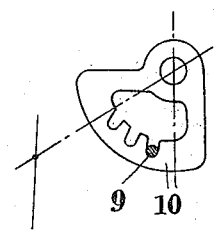
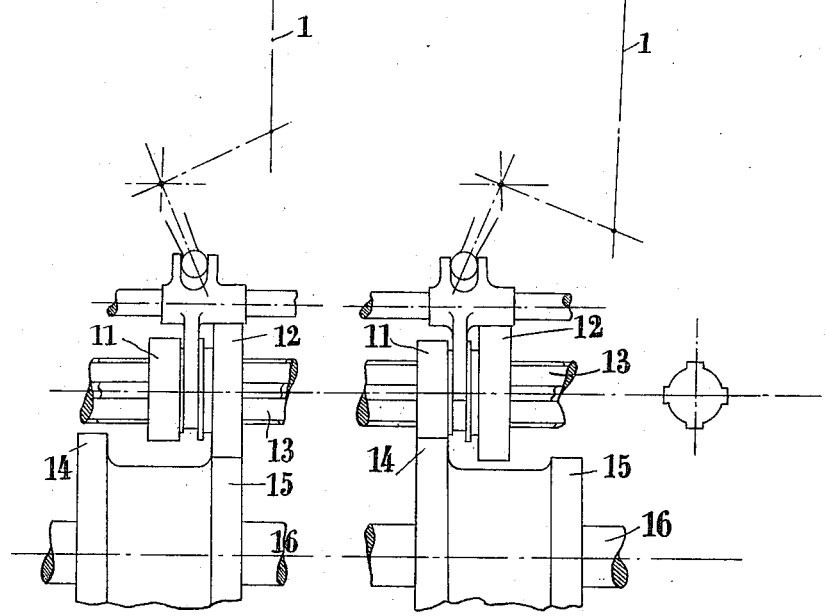
Witnesses:
L. C. Badeau.
H. D. Penney
Inventor:
Alfred Andri,
By his Attorney,

UNITED STATES PATENT OFFICE.

ALFRED ANDRI, OF LIEGE, BELGIUM, ASSIGNOR TO FABRIQUE NATIONALE D'ARMES DE GUERRE SOCIETE ANONYME, OF HERSTAL, BELGIUM.

GEARING.

1,017,070. Specification of Letters Patent. Patented Feb. 13, 1912.

Application filed November 17, 1909. Serial No. 528,474.

*To all whom it may concern:*

Be it known that I, ALFRED ANDRI, a subject of the Kingdom of Belgium, residing at Rue Laport 3, Liege, Belgium, have invented certain new and useful Improvements in Gearing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a speed regulating apparatus for motor cars and the like which allows of the automatic disengagement of the friction clutch before changing speed. This system avoids the drawbacks and dangers of the ordinary systems in which it is necessary to effect separately and successively the disengagement of the clutch, then the regulation of speed and finally the reëngagement of the clutch. Its use is to be recommended in all mechanical transmissions of power which have to be worked at varying speeds and in which apparatus for progressive speed-regulation are not employed. Among the cases in which it is applicable may be cited motor cars and motor-cycles. Its use is particularly advantageous in the last named machines as, in this case, all controlling and regulating must be carried out with one hand only.

The apparatus which forms the object of the present invention is essentially characterized by a speed-regulating operating lever, to which is connected a rod which manually effects the changing or disengagement of the gears as soon as the aforesaid lever is moved with a view to effecting variation in the speed of the driven shaft, and through another connection, to simultaneously disengage the clutch member. As soon as the gear lever is released the reëngagement of the clutch takes places automatically.

The accompanying drawings show, by way of example, one form of applying this invention.

Figure 1:
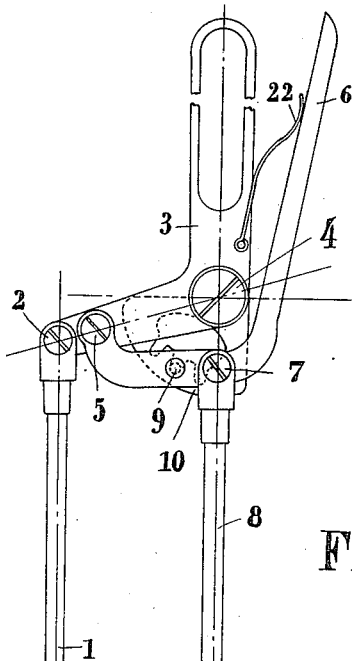
Figure 6:
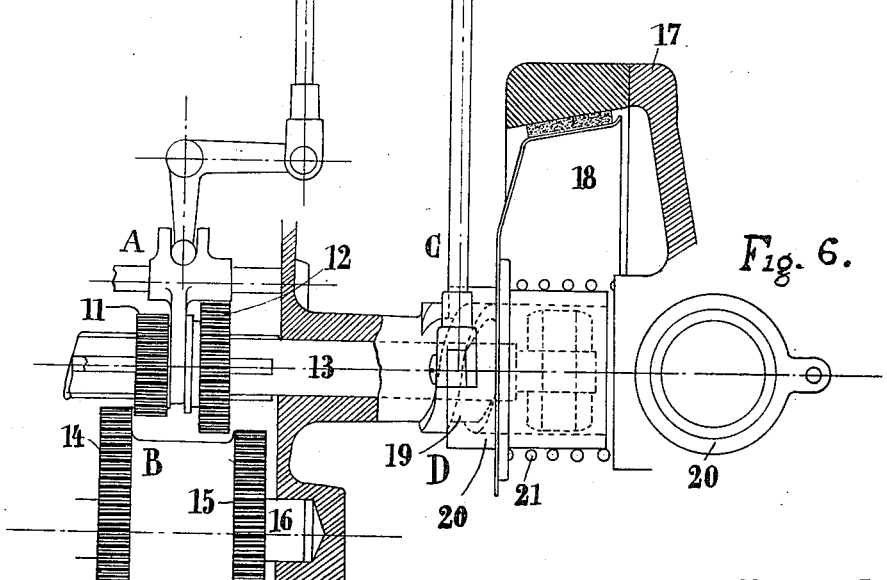

In these drawings:—Figure 1 is an outline view of the apparatus. Fig. 2 is an analogous view to that of Fig. 1, but shows the gearing in the disengaged position. Fig. 3 is a side view of the upper part of the operating lever. Figs. 4 and 5 give a diagrammatic representation of the parts in the case of slow and high-speed transmissions. Figs. 6 and 7 are end views of the nut 20, shown in the adjacent views.

The change speed gearing operating rod 1 is pivoted at 2 on an operating-lever 3 pivoted at a fixed point 4. On this operating lever 3 is pivoted at 5 a handle 6 to which is pivoted at 7 the rod 8 which controls the friction clutch. This handle crank 6 carries a pin 9 which is capable of engaging one of three notches of a fixed sector 10. It is evident that, as soon as the pin 9 of the handle 6 is engaged in one of the notches of this sector 10 the operating handle 3 is locked and that, to release it and thereby work the change speed gear operating rod it is first of all, necessary to operate the handle 6 rotating it to a certain extent around its axis 5 by which means the pin 9 is disengaged and the friction clutch disengaging rod 8 operated at the same time.

The change speed and clutch systems operated by rods 1 and 6 respectively may be of any type which are suitable to the present invention, seeing that the clutch disengaging mechanism controls the change speed gear operating shaft. In the form herein adopted the change speed mechanism comprises two gears 11 and 12 mounted on the driving-shaft 13, but which are capable of movement along this shaft by means of the aforesaid rod 1; according to the position occupied on this shaft, one or the other of the gears engages with one or the other of the wheels 14 and 15 of the driven shaft 16. The system of gearing adopted in the form of apparatus herein described comprises a fly-wheel 17 with conical rim reamed on the inside against which contacts a wheel 18 with conical outside rim. This wheel 18 follows the rotatory movement of the shaft 13 while being capable of movement along said shaft. This shaft 13 works through a fixed sleeve 19 screw threaded on the outside and on which works a nut 20, the rotation of which is controlled by the rod 8. The apparatus is completed by a cylindrical spiral spring 21, which, under ordinary circumstances tends to press the clutch member 18 toward the position of engagement with the internal cone-clutch member 17.

When the different parts occupy the position shown in Fig. 1 neither of the gears 11 and 12 is in engagement with those of the driven shaft 16; on the other hand, the cone clutch member 18, under the pressure of the spring 21, is in contact with internal cone clutch member 17, whereby the shaft 13 is connected to the operating motor or the like and in this position the pin 9 of the handle 6 is engaged in the central notch of the sector 10.

In order to operate the speed changing mechanism it is necessary first of all, to release the operating lever 3, this being effected by working the handle 6. On raising this crank the rod 8 is raised and the disengagement of the clutch takes place. After the operating lever 3 has been moved to operate the speed changing mechanism and set the gear in position for the speed required, and parts 3, and 6 have been released, the latter separate under the action of the spring 22 and the handle 6 in its downward movement lowers the rod 8 and thereby causes the reëngagement of the clutch; the pin 9 reentering one or other of the end notches in the sector 10 (Figs. 5 or 4) and re-locks the apparatus.

Claims:

1. The combination with a gear-set of fixed and movable gear members, and a clutch device of a lever having a fixed pivot, connections between the lever and the gear-set for shifting the movable gear members upon swinging the lever, a second lever pivoted on said lever beyond its axis, connections between the second lever and the clutch device, a stationary locking member positioned to be engaged by the second lever, and an operative connection between the two said levers.

2. The combination with a gear-set of fixed and movable gear members, and a clutch device of a lever having a fixed pivot, connections between the lever and the gear-set for shifting the movable gears upon swinging the lever, a second lever pivoted on said lever beyond its axis, connections between the second lever and the clutch device, a stationary locking member positioned to be engaged by a portion of the second lever, and a spring connection between the two said levers.

3. The combination with a gear-set of fixed and movable gear members, and a clutch device; of a lever having a fixed pivot, connections between the lever and the gear-set for shifting the movable gear members upon swinging the lever, a second lever pivoted on said lever beyond its axis, connections between the second lever and the clutch device, a stationary locking member positioned to be engaged by a portion of the second lever, and a spring connection between the two said levers operative to shift the second lever into engagement with the locking plate.

4. The combination with a gear-set of fixed and movable gear members, and a clutch device, of a lever having a fixed pivot, connections between the lever and the gear set for shifting the movable gear members upon swinging the lever, a second lever pivoted on said lever beyond its axis, connections between the second lever and the clutch device, a connection between the two said levers, a pin on the second lever, and a stationary locking plate having notches arranged to receive the said pin on the second lever and thereby retain the first said lever in adjusted positions.

5. The combination with a gear-set of fixed and movable gear members, and a clutch device, of a lever having a fixed pivot, connections between the lever and the gear set for shifting the movable gear members upon swinging the lever, a second lever pivoted on said lever beyond its axis, connections between the second lever and the clutch device, a spring connection between the two said levers, a pin on the second lever, and a stationary locking plate having notches arranged to receive the pin on the second lever and thereby retain the first said lever in adjusted positions.

6. The combination with a gear-set, and a clutch device, of a two arm lever swinging on a fixed pivot and having an arm connected with the gear-set to shift the gears, a second lever pivoted on said latter arm of the other lever and having its extremity arranged in proximity to the free arm of said lever, a pin on the second lever, a stationary locking plate provided with notches in position to be engaged by the said lever pin, a spring on one of said levers engaging the other lever and arranged to retain the pin in any one of said notches, and a connection between the clutch and the second lever whereby the clutch is engaged when the pin is in one of said notches, and free when the pin is raised out of the notches, the gear-set being set in different positions according to the different notches in which the pin is locked.

7. The combination with a gear-set, and a clutch device, of a two arm lever swinging on a fixed pivot and having an arm connected with the gear-set to shift the gears, a second lever pivoted on said latter arm of the other lever and having its extremity arranged in proximity to the free arm of said lever, a pin on the second lever, a stationary locking plate provided with notches in position to be engaged by the said lever pin, a spring on one lever, engaging the other lever and arranged to retain the pin in any one of said notches, and a spring connection tending to operate the clutch, whereby the clutch is engaged when the pin is in one of said notches and free when the pin is raised out of the notches, the gear-set being set in different positions according to the different notches in which the pin is locked.

In testimony that I claim the foregoing as my invention, I have signed my name in presence of two subscribing witnesses.

ALFRED ANDRI.

Witnesses:
  LEONARD LEVA,
  ALEX LALLEMAND.

Copies of this patent may be obtained for five cents each, by addressing the "Commissioner of Patents, Washington, D. C."